US007928370B2

(12) United States Patent
Amirav et al.

(10) Patent No.: US 7,928,370 B2
(45) Date of Patent: Apr. 19, 2011

(54) OPEN PROBE METHOD AND DEVICE FOR SAMPLE INTRODUCTION FOR MASS SPECTROMETRY ANALYSIS

(75) Inventors: Aviv Amirav, Hod Hasharon (IL); Alexander Gordin, Ashdod (IL)

(73) Assignee: Aviv Amirav, Hod Hasharon (IL)

( * ) Notice: Subject to any disclaimer, the term of this patent is extended or adjusted under 35 U.S.C. 154(b) by 208 days.

(21) Appl. No.: 12/469,779

(22) Filed: May 21, 2009

(65) Prior Publication Data

US 2010/0019140 A1 Jan. 28, 2010

(30) Foreign Application Priority Data

Jul. 23, 2008 (IL) .......................................... 193003

(51) Int. Cl.
*H01J 49/26* (2006.01)
*B01D 53/02* (2006.01)

(52) U.S. Cl. ............ 250/288; 250/281; 250/282; 95/82; 95/87; 95/89; 96/101; 96/102; 96/104

(58) Field of Classification Search .................. 250/281, 250/282, 285, 288; 95/82, 87, 89; 96/101, 96/102, 104
See application file for complete search history.

(56) References Cited

U.S. PATENT DOCUMENTS

| | | | | |
|---|---|---|---|---|
| 3,976,450 | A * | 8/1976 | Marcote et al. | 96/12 |
| 5,686,656 | A | 11/1997 | Amirav et al. | |
| 2001/0013579 | A1 * | 8/2001 | Andrien et al. | 250/423 R |
| 2006/0255261 | A1 * | 11/2006 | Whitehouse et al. | 250/288 |

* cited by examiner

*Primary Examiner* — David A Vanore
*Assistant Examiner* — Nicole Ippolito Rausch
(74) *Attorney, Agent, or Firm* — Martin Fleit; Paul D. Bianco; Fleit Gibbons Gutman Bongini & Bianco PL

(57) ABSTRACT

An open probe method for sample introduction into a mass spectrometer is disclosed, comprising the steps of: loading a sample holder with sample compounds to be analyzed; heating a probe oven; introducing said sample compounds in said sample holder into said heated probe oven; flowing inert gas into said heated probe oven; vaporizing said sample in said heated probe oven by the combined effect of oven temperature and inert gas flow; entraining said vaporized sample in said inert gas; and, transferring said vaporized sample in inert gas into an ion source of a mass spectrometer; wherein said heated probe oven remains open to the ambient atmosphere during sample introduction and analysis; said inert gas is flowing in said heated probe oven in two directions of a transfer line to a mass spectrometer ion source and to the oven opening; said vaporized sample in inert gas is transferred through a heated transfer line directly into the ionization chamber of an ion source of a mass spectrometer. An apparatus for this method of sample introduction is also disclosed. The primary advantage of this method and apparatus is that the heated probe oven remains open to the ambient atmosphere during sample introduction and analysis thereby enabling faster sample analysis.

40 Claims, 8 Drawing Sheets

OPEN PROBE METHOD AND DEVICE FOR SAMPLE INTRODUCTION FOR MASS SPECTROMETRY ANALYSIS

FIELD OF THE INVENTION

The present invention relates in general to methods for sample introduction into mass spectrometers, and in particular to an "open probe" method that allows rapid introduction of a sample at atmospheric pressure into a mass spectrometer.

BACKGROUND OF THE INVENTION

Mass spectrometry (MS) is a central analytical technology that finds a large variety of applications in a broad range of fields, especially when coupled with a chromatographic separation technique such as gas chromatography (GC) or liquid chromatography (LC). While these chromatographic separation technologies of GC and LC provide significant merit in the separation of complex mixtures prior to their detection and identification by mass spectrometry, these separation methods also require long analysis times, typically in the order of 30-60 min. In addition, the long gas chromatography columns typically used can degrade thermally labile compounds in GC-MS analysis, while LC-MS suffers from poor mass spectral identification capability due to its use of electrospray or APCI for sample ionization rather than electron ionization, which is used with automated library based sample identification. As a result, several types of mass spectrometry probes have been developed in order to simplify and shorten the analysis time of essentially pure samples or samples in simple mixtures that do not require prior chromatographic separation. Most of these mass spectrometry (MS) probes are based on sample introduction via a miniature test tube (vial) that is introduced into the MS ion source through an airlock and bypass intermediate vacuum chamber, which has its own small vacuum pump in order to prevent air penetration into the MS ion source vacuum chamber. In addition, these probes have their own temperature controllers for the stabilization of sample vaporization rate (flux) at the ion source. As a result, these MS probes are expensive (typical price is in excess of $10,000) and although their use is much shorter in time than typical GC-MS or LC-MS analysis, it is not performed in real time and require about 5-10 min per analysis. Furthermore, due to the danger of leaks, standard MS probes cannot be operated or used by untrained personnel (such as students) due to the danger of excessive and detrimental leaks (detrimental to the vacuum pumps and ion source filaments) during the sample introduction procedure through the air lock chamber. Another significant downside to MS probes is the fact that the use of these probes is known to be involved with major and long lasting contamination of the MS ion sources due to small sample particles that fall inside the ion source. These contaminants reduce the probe sensitivity through the creation of a constant mass spectral background, lead to the necessity of periodic ion source cleaning, and complicate conversion of the system to GC-MS. A unique type of MS probe was developed in 1996 and later named ChromatoProbe (A. Amirav and A. Dagan, U.S. Pat. No. 5,686,656). This device is characterized by sample introduction in a small vial as in standard probes but the vials are introduced in a vial holder into a temperature controlled sealed GC injector for achieving a controlled sample vaporization rate, and the pressurized GC injector is connected to the MS ion source via a short capillary transfer line that acts as a flow restrictor. The ChromatoProbe solves some of the standard MS Probe problems but it still requires an approximately 5 minute analysis time due to the need to adjust the injector temperature to an optimal value and then cool it back for the next analysis (as well as sealing and pressure build-up time). In addition, the ChromatoProbe must employ a GC injector and hence requires the availability of a big GC near the MS for its application; additionally, with a current price of $3750, it is not inexpensive. Recently, desorption electrospray (DESI) and similar techniques have received significant attention as new methods that allow fast organic surface analysis without sample preparation through ambient (atmospheric) pressure ionization and ion transfer into the mass spectrometer. However, these techniques suffer from highly non-uniform response, are ineffective with several groups of compounds and do not share the extensive mass spectral information and library identification strength of electron ionization. Furthermore, they require expensive LC-MS instrumentation and cannot use the lower cost mass spectrometer of GC-MS instruments.

Thus, there is growing need for a simple MS probe device that will allow real time analysis with a cycle time of on the order of a few seconds, and that will be small, inexpensive, sensitive, and capable of fast self cleaning.

During the last 18 years, Amirav and coworkers have developed a new type of GC-MS which is based on the use of supersonic molecular beams (SMB) (also named Supersonic GC-MS). Supersonic GC-MS is based on GC and MS interface with SMB and on the electron ionization (EI) of vibrationally cold analytes in the SMB (cold EI) in a fly-through ion source. This ion source is inherently inert and further characterized by fast response and vacuum background filtration capability. The same ion source also offers a mode of classical EI. Cold EI, as a main mode, provides an enhanced ratio of molecular ion to fragment ions as well as effective library sample identification which is supplemented and complemented by a powerful isotope abundance analysis method and software. The range of low volatility and thermally labile compounds amenable to analysis is significantly increased due to the use of a contact-free fly-through ion source and the ability to lower sample elution temperatures through the unique use of high GC column carrier gas flow rates. Another important feature of the Supersonic GC-MS is its compatibility with very high column flow rates without any adverse effect on its sensitivity due to the availability of differential vacuum chamber for the supersonic nozzle. In fact, the Supersonic GC-MS was reported to be compatible with 240 ml/min column flow rate which is 240 times higher than prevailing in standard GC-MS. Thus, with the high flow rates of the Supersonic GC-MS, samples that are injected into volumes such as of the GC injector liners can be evacuated in less than a second. In contrast, in standard GC-MS the injection takes over a minute to evacuate ~70% of the injector liner volume and about 10 minutes for full self cleaning. This difference is a major qualitative difference between the Supersonic GC-MS and standard GC-MS. However, it comes with a major penalty to the Supersonic GC-MS in the form of significant added complexity of added vacuum chamber, additional large vacuum pump, additional pneumatics, different ion source and its geometrical arrangement, added ion mirror and several other different aspects.

It is therefore a broad object of the present invention to provide an open probe method and device for sample introduction for mass spectrometry analysis.

BRIEF DESCRIPTION OF THE INVENTION

It is an object of the present invention to provide a method for sample introduction into a mass spectrometer, comprising the steps of: loading a sample holder with sample compounds to be analyzed; heating a probe oven; introducing said sample compounds in said sample holder into said heated probe oven; flowing inert gas into said heated probe oven; vaporizing said sample in said heated probe oven by the combined effect of oven temperature and inert gas flow; entraining said vaporized sample in said inert gas; and, transferring said vaporized sample in inert gas into an ion source of a mass spectrometer. It is within the essence of the invention wherein said heated probe oven remains open to the ambient atmosphere during sample introduction and analysis; said inert gas flows in said heated probe oven in two directions of a transfer line to a mass spectrometer ion source and to the oven opening; said vaporized sample in inert gas is transferred through a heated transfer line directly into the ionization chamber of an ion source of a mass spectrometer.

It is a further object of this invention to provide an open probe device for sample introduction into a mass spectrometer comprising: a sample holder for holding sample compounds to be analyzed; a probe oven; a heater adapted for heating said probe oven; a probe oven connection to an external source of gas; a source of inert gas; means for introducing said inert gas into said probe oven; means for flowing said inert gas in said probe oven in two directions of a transfer line to said mass spectrometer and to the opening of said oven; means for controlling the flow rate of said inert gas; heated probe oven means for vaporizing said sample compounds by the combined effect of oven temperature and inert gas flow; and heatable means for transferring said vaporized sample compounds into an ion source of a mass spectrometer. It is within the essence of the invention wherein said heated probe oven remains open to the ambient atmosphere during sample introduction and analysis; said heated probe oven further includes means for flowing said inert gas in said probe oven in two directions of a transfer line to a mass spectrometer and to the oven opening; said means for transferring said vaporized sample compounds into an ion source of a mass spectrometer is based on a heated transfer line interconnected at one end with said heated probe oven and at the other end with the ionization chamber of an ion source of a mass spectrometer.

BRIEF DESCRIPTION OF THE DRAWINGS

The invention will now be described in connection with certain preferred embodiments with reference to the following illustrative figures, so that it may be more fully understood. With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. It will be apparent to one skilled in the art that there are several embodiments of the invention that differ in details of construction, without affecting the essential nature thereof, and therefore the invention is not limited by that which is illustrated in the figures and described in the specification, but only as indicated in the accompanying claims, with the proper scope determined only by the broadest interpretation of said claims.

In the drawings.

DETAILED DESCRIPTION OF THE INVENTION

Figure 1:
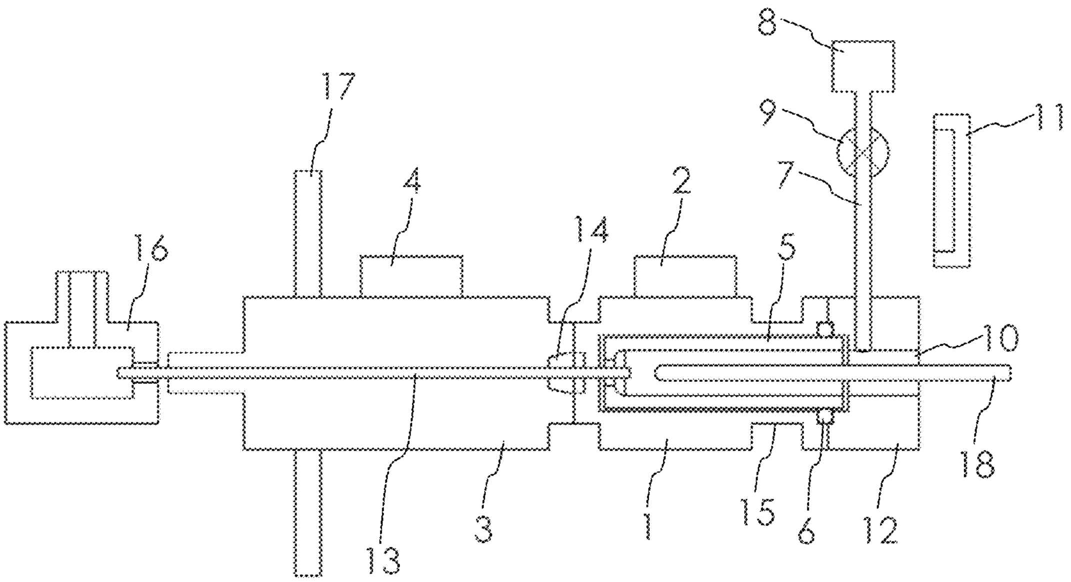
FIG. 1 is a schematic diagram illustrating the open probe device, according to the present invention.

Reference is now made to FIG. 1, in which a preferred embodiment of the novel open probe is presented schematically. It comprises a heated open probe oven 1 with a separate heater element 2 which is mounted on a GC-MS transfer line 3 which is heated by its heater element 4. The open probe oven includes an inert fused silica or glass tube liner 5 which is typically sealed by an O-ring 6. The open probe oven further includes a gas supply line 7 that is connected to a gas supply source 8 that further comprises a flow controller and valve 9. Helium is the typical gas of choice due to its inertness and optimized compatibility with low space charge in standard ion sources, and for effective jet separation and aerodynamic acceleration with supersonic GC-MS. Hydrogen and even nitrogen, or mixtures thereof, can be used as well according to this invention.

The main and most important feature of the open probe is that its oven is open to ambient air pressure through opening 10, which can be closed and sealed while not in use by clamp 11. Despite the presence of opening 10, the mass spectrometer ion source with its air sensitive filament and delicate samples at the open probe hot oven are protected from air by the flow of excess helium gas, provided from gas inlet 7 through the length of gas purge protector element 12. The total helium gas flow rate is divided between a portion that flows through the transfer line flow restriction capillary tube 13 (sealed by seal 14) and a portion that purges the open probe oven (exiting through opening 10) through the purge gas protector 12 into the ambient air while flushing away any air or another gas, and preventing entry of air into the open probe and MS ion source. In a typical embodiment of the invention, the flow through the capillary tube is about 1-2 mL $min^{-1}$ and the purge rate is about 20-60 mL $min^{-1}$. In a typical embodiment in which the Open Probe is used in combination with a Supersonic GC-MS, the liner ID is 9 mm, and a 3 cm purge protector length is sufficient to reduce air penetration to a negligible level at a helium purge flow rate of 60 ml $min^{-1}$. Obviously, the narrower the purge protector liner ID and/or the longer it is, the smaller is the required helium purge flow rate. In an additional embodiment, probe oven 1 has a narrow neck 15 before its opening to the room air through the purge gas protector element 12. This narrow neck structure serves as a thermal conductivity barrier to reduce the probe oven opening temperature and as a safety mechanism that ensures that the user will not accidentally touch a hot surface during open probe sample introduction. It also enables the user to choose the sample temperature and vaporization rate through the sample insertion depth.

Transfer line 3 according to the present invention serves the two purposes of (a) transferring sample compounds from the open probe to the MS ion source (for this purpose it must be heated by heater 4 to prevent sample condensation) and (b) acting as a flow restrictor to restrict the inert gas flow rate from the open probe to the mass spectrometer to a low flow rate level that can be accepted in terms of the pressure rise that it creates at the mass spectrometer vacuum chamber of the mass spectrometer and its ion source for their proper operation. Thus, transfer line 3 includes a capillary transfer line tube 13. In a typical embodiment, the capillary transfer line tube is about 20 cm long and has an internal diameter of 120 microns (in the range of 100-150 microns), which restricts the helium flow rate to about 1 mL $min^{-1}$ (less than 2 mL $min^{-1}$), which is generally compatible with standard electron ionization ion sources in standard GC-MS systems.

The transfer line capillary ends inside the electron ionization ion source 16 as in common practice with standard GC-MS systems. The transfer line and open probe device are mounted on the mass spectrometer vacuum chamber via flange 17 which is properly aligned with ion source 16. Sample introduction can be performed in several ways, including via standard miniature vials, with small spoon-like glass sample holders, or with an inert swab. In one embodiment specifically adapted for fast sampling, sample introduction is provided via small thin walled glass tubes or rods 18 with diameter of less than about 3 mm, e.g. tubes of about 1-1.6 mm diameter that are used for the determination of melting points of organic compounds. A preferred method of sample introduction into the open probe comprises the following steps: (a) the sample powder is touched by the external bottom surface of the closed side of the glass tube (b) a drop or two of solvent such as acetone or methanol is dripped with a Pasteur pipette (or a medicine dropper) onto the glass tube on its bottom (sample) side, while it is on a disposable weighing paper or microscope slide glass or another surface, reducing the amount of sample on the tube to about or below a microgram; (c) the glass tube is dried during the course of about a few seconds while it is taken to the open probe by air, or by the hot helium purge flow in front of the open probe opening; (d) the glass tube with the sample is introduced into the heated open probe oven and the sample is quickly vaporized since the thin walled glass tube has low thermal mass; (e) the sample vapor is swept by the helium gas flow through the transfer line into the ion source where the sample is ionized and mass analyzed. This whole process of sampling, sample introduction, mass spectrometry analysis and self cleaning typically can take less than 10 seconds. While the use of melting point glass tubes (vials) is very effective in the sampling of relatively pure compounds, it is specifically effective for the fast analysis of human finger print (under 10 s cycle time). Merely touching a finger to the bottom of the melting point tube is sufficient to obtain a mass spectrum of the multitude of compounds in the fingerprint. A preliminary analysis of our results shows that the chemical mass spectral fingerprint of clean hands of several people is practically identical, thereby demonstrating the utility of this method for analysis of fingerprint contamination.

For the practice of the fast method of sample introduction as described above with low thermal mass glass tubes, nanogram range sample amounts and isothermal probe oven temperature are very important, since it obviates possible objections to its utility based on the (incorrect) perception that it must necessarily involve a very long self cleaning time. This incorrect perception is based on the low flow rate acceptance of standard GC-MS and the use of sampling with standard probe vials which require temperature programming and very long self cleaning time due to the use of samples weighing at least several μg.

While FIG. 1 illustrates a preferred embodiment of the novel open probe method and device, additional embodiments comprising additional and beneficial features are described below.

Since with standard GC-MS, unlike supersonic GC-MS, the inert gas flow rate inside the open probe into the MS transfer line is limited to about 1 mL $min^{-1}$, the sample residence time and cycle time (on the order of minutes) is too long for most applications. A simple calculation shows that even for a miniaturized open probe with liner volume of 0.2 ml and a typical transfer line flow rate of 1 mL $min^{-1}$, the open probe evacuation time constant will be 0.2 min and its full self cleaning could take more than 2 minutes even without considering intra open probe oven adsorption-desorption cycles and the possible presence of powder particles remaining in the oven. Furthermore, such a long residence time is likely to significantly enhance sample decomposition, thereby degrading the ability of the open probe as an MS probe to perform one of its most important functions, namely, the analysis of thermally labile compounds. Thus, an increased flow rate through the open probe oven could be highly beneficial if not essential to many applications. An open probe design with minimal or reduced internal volume can contribute to faster open probe response time but below certain minimal dimensions it could impede its ease and flexibility of use of various sample holders.

Figure 2:
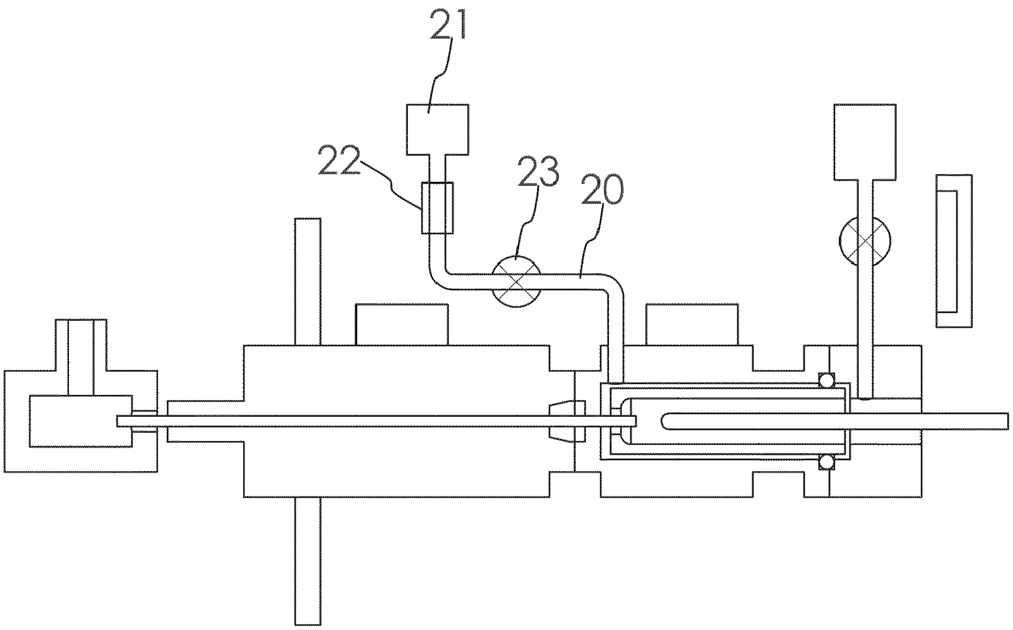
FIG. 2 is a schematic diagram illustrating an additional embodiment of the open probe device of FIG. 1 according to the present invention, which enables fast analysis with standard GC-MS systems despite their low column flow rate in the transfer line to the ion source, via the addition of a flow splitter to a separate vacuum pump.

Reference is now made to FIG. 2, which presents schematically an additional embodiment of the invention herein disclosed. For clarity, only the components not already shown in FIG. 1 are marked explicitly. This embodiment provides a good way to achieve increased open probe flow rate by using a flow splitter (20-23) after the open probe oven and its liner, so that a portion of the inert gas flow will be directed via the transfer line to the MS ion source (16 in FIG. 1), while most of the inert gas flow is directed through this added flow splitter tube 20 into a vacuum pump 21 or even to the GC-MS rotary pump that serves as the backing pump of the MS turbo molecular pump. This way, the open probe flow rate can be arbitrarily increased through the use of split flow, as desired, but the penalty is that the sensitivity will be reduced correspondingly with the split ratio. Since most probe analyses are performed only qualitatively in any case, and with large (macroscopic) sample amounts, high sensitivity is not important for these applications in any case. In order to reduce size and cost, vacuum pump 21 typically produces a relatively low vacuum (about 0.9 Bar absolute), and its pumping speed is regulated and controlled simply via the use of a frit flow restrictor element 22. In practice, the split pumping tube 20 can itself serve as an effective flow restrictor by the proper choice of its length and internal diameter. For example, a total pump flow rate of 39 mL $min^{-1}$ with a 1 mL $min^{-1}$ transfer line flow rate to the MS ion source will reduce both the sample flux, and open probe response time, by a factor of 40. Alternatively, the open probe oven diameter and liner volume can be increased for having more convenient and flexible use of the open probe or the combined open probe liner volume and response time reduction factor can be increased by a factor of 40 such as with 10 times faster self cleaning combined with 4 times bigger open probe liner volume. A valve 23 is added between the pump 21 and open probe oven, located in the flow splitter tube 20 in order to prevent carry over and back migration of previous samples to the MS ion source when the open source is not in use plus to suppress air leak through the pump into the MS vacuum chamber during idle times. Since the open probe is open to ambient pressure, flow splitting must necessarily use a vacuum pump. However, unlike with standard MS probes, the subambient pressure of the pump can be minimal since it does not involve sample introduction into high vacuum, and very simple and low cost vacuum pumps can be used. We note that the valve 23 can also be time programmed to enable a square wave-like signal with predetermined signal time to enable MS-MS analysis of several masses.

Figure 3:
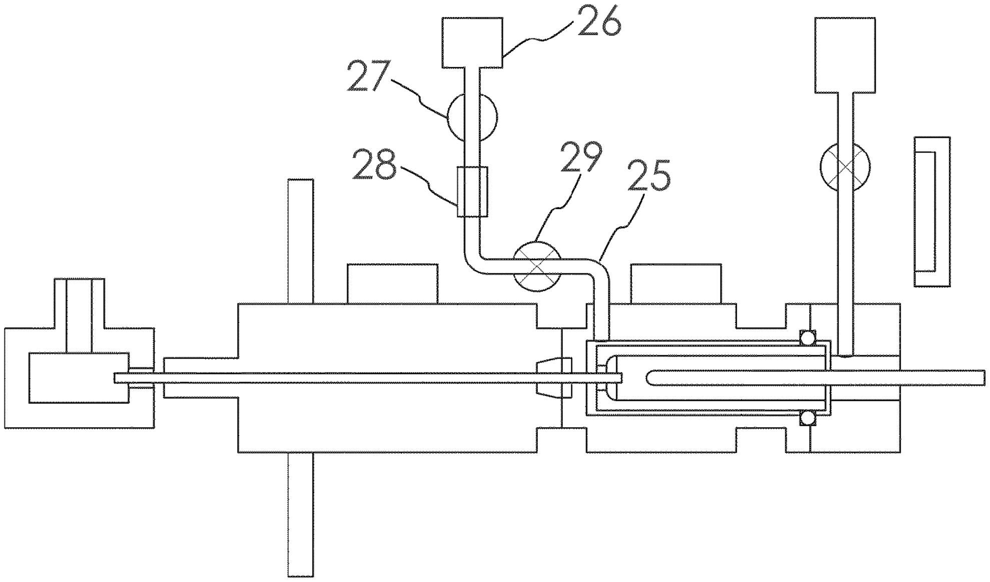
FIG. 3 is a schematic diagram illustrating an additional embodiment of the open probe device of FIG. 1 according to the present invention, which enables fast analysis with standard GC-MS systems despite their low column flow rate in the transfer line to the ion source, which operates via a time programmed gas pulse from an additional gas source that ejects the sample into the ambient atmosphere after its insertion through the probe opening.

Reference is now made to FIG. 3, which presents schematically an additional embodiment of the invention herein disclosed. For clarity, only the components not already shown in FIG. 1 are marked explicitly. This embodiment provides another efficient way of achieving a faster open probe response time by using a gas pulse generated from a gas pulse generator (25-29). The gas pulse is introduced into the open probe oven from gas pulse transfer line tube 25, which is connected to the open probe from its outlet end at a point beyond its liner (which served as the gas split output in the embodiment illustrated in FIG. 2).

A predetermined time after the sample is introduced into the open probe, an inert gas pulse is directed via gas pulse transfer line 25 into the open probe liner, whereupon it expels the vaporized sample inside the open probe liner to the ambient atmosphere via the open probe opening. A predetermined time after the sample is introduced into the open probe, an inert gas pulse is directed via gas pulse transfer line 25 into the open probe liner, whereupon it expels the vaporized sample inside the open probe liner to the ambient atmosphere via the open probe opening. In a preferred embodiment of the invention, this predetermined time is between about 1 and about 10 seconds. The gas pulse is generated from gas source 26 which can be the same as that of the open probe main gas source or alternatively an independent gas source. The gas source pressure is stabilized by pressure regulator 27 and its flow rate is regulated by an electronic flow controller 28 or a frit flow restrictor element, or alternatively by the combined effect of the gas source pressure and flow impedance of the transfer line tube 25. The gas pulse is introduced by pulsed time programming of gas valve 29. The sample can remain for a long time (a minute or more) at the open probe liner after being vaporized with the production of a substantially steady or slowly declining signal.

After the introduction of the gas pulse, the sample is quickly expelled since the gas pulse flow rate can be arbitrarily high; as a non-limiting example, for a liner of 1 ml volume and a gas pulse flow rate of 600 ml/min for 1 s, the liner can be cleaned in 0.1 s and fully cleaned in 1 s while using only 10 ml of gas. Note that since, as its name implies, the open probe is open, the pulsed gas flow rate is unlimited since any excess gas flows to the ambient environment without affecting the ion source and vacuum chamber pressure. This way, as with the use of split pump, the open probe self cleaning response time can be arbitrarily reduced as desired, with a reduction in sensitivity in parallel with the response time reduction. The use of a liner cleaning gas pulse combined with time programming of gas valve 29 enables the production of a square wave like signal with predetermined signal time to enable MS-MS analysis of several masses. Gas valve 29 can be a simple two way valve or a three way valve to simultaneously stop the standard open probe gas flow rate during the use of the gas pulse.

While the use of a gas pulse provides a simple way for facilitating fast self cleaning of the open probe, is has two drawbacks versus the use of split pump as described in FIG. 2: A) The excess sample is expelled into the ambient air, which can pose a health hazard to the open probe operator with certain type of samples, as opposed to the use of a split pump, wherein the pump exhaust can be followed by a chemical trap as is customarily used with GC split injectors thereby eliminating this hazard. B) The pulsed gas requires time programming activation from the time of sample introduction into the open probe.

Figure 4:
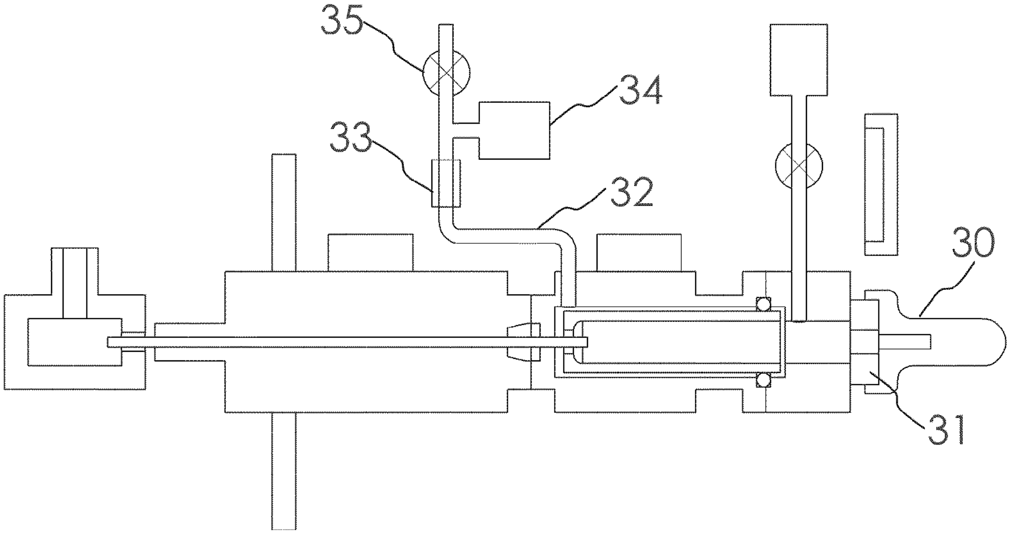
FIG. 4 is a schematic diagram illustrating an additional embodiment of the open probe device of FIG. 1 according to the present invention, which enables fast analysis with standard GC-MS systems despite their low column flow rate in the transfer line to the ion source, which operates via a manual closure of the open probe purge opening while forcing the gas to sweep and clean the open probe oven and exit through a split gas exit.

Reference is now made to FIG. 4, which presents schematically an additional embodiment of the invention herein disclosed. For clarity, only the components not already shown in FIG. 1 are marked explicitly. This embodiment provides another efficient yet simple way (in terms of minimal added hardware) of achieving faster open probe response time by using a seal to close the open probe purge opening thereby forcing the added gas to sweep and clean the open probe oven liner while exiting through a split gas exit. After the introduction of the sample holder with sample into the open probe oven for sample vaporization, the sample holder is removed and a sealing device 30 with a seal 31 is placed at the open probe purge protector opening. As a result of such purge gas exit sealing, the full purge gas flow rate is now forced to flow through the liner into split gas line 32, which has relatively low flow restriction by frit or gas tube flow restrictor 33. Gas line 32 further contains two additional valves, a safety check valve (34) and a second valve (35) which is open during operation. The sample signal is formed after sample introduction and vaporization as usual, and it remains while slowly decaying for a relatively long time which depends on the open probe oven volume and flow rate via the transfer line to the mass spectrometer ion source. After a user-selected amount of time, the user seals the open probe with the sealing device 30+31, and the full purge gas flow cleans any remaining sample from the open probe. The response time can be less than one second, since the purge gas flow rate (in ml/s) is typically greater then the liner volume (in ml), and even if the sample is of low volatility, only a few seconds are required to reduce its mass spectrometer signal to a negligible level. We note that the sealing device can be as simple as a GC septum or an O-ring loaded in a sealing unit, or it can be in the form of a device that also holds the sample holder. While this method of fast sample cleanup is the simplest in terms of minimizing added hardware, it adds an additional manual step (that can be automated) which slightly increases the minimum time needed for open probe operation. Another consideration is that if the valve 35 is closed and the open probe purge opening is sealed, the full purge gas flow rate might be forced into the mass spectrometer vacuum chamber, which might damage its turbo molecular pump. Thus, a safety check valve 34 is added and/or the maximum pressure of the gas supply unit must be kept below about 1.5 Bar absolute in order to ensure that the maximum pump throughput is not exceeded. While valve 35 is open during open probe operation, it is closed when the open probe is not operated and inert gas does not flow in it in order to prevent air leakage into the mass spectrometer.

We note that all the three additional embodiments of the invention disclosed above and further described in FIGS. 2-4 are characterized by having a gas tube which is connected to the output end of the open probe liner. This additional gas tube serves either to exhaust or to introduce inert carrier gas in order to facilitate faster sweeping and removal of sample vapor from the open probe liner.

Figure 5:
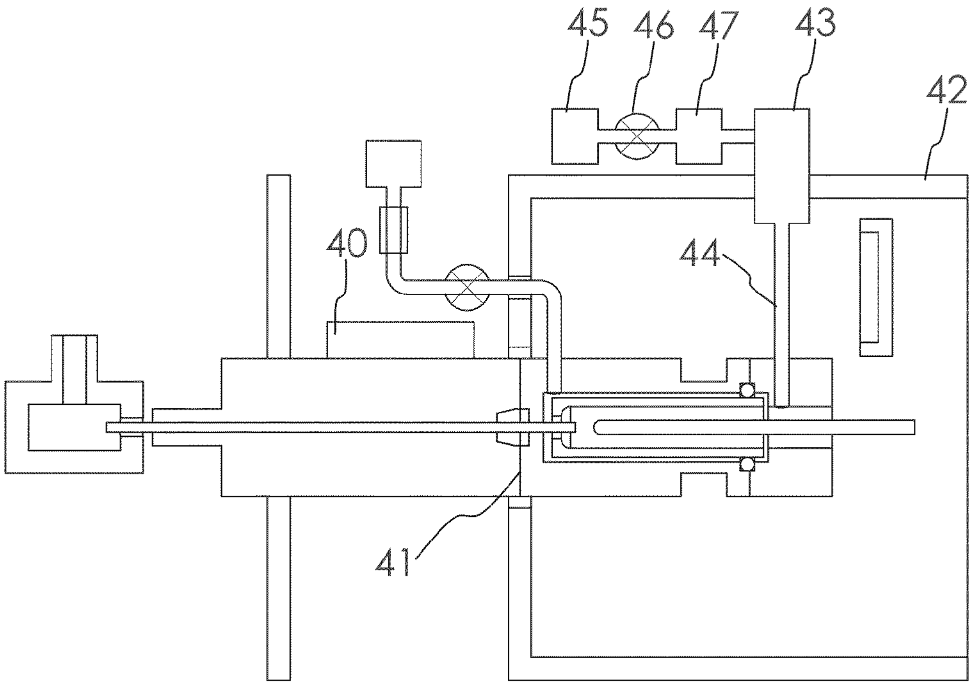
FIG. 5 is a schematic diagram illustrating a variation of the open probe device for its cost effective use with GC-MS systems while using the GC-MS transfer line heater as the open probe oven heater and the GC injector flow control as the open probe supply of transfer line and purge gas.

While the open probe, like other probes, can serve mass spectrometry without requiring the presence of a GC near it, its anticipated most frequent use is in GC-MS systems since GC-MS is by far more widely used than standalone MS. Reference is now made to FIG. 5, which illustrates schematically an embodiment of the present invention in which it serves as a simple and low cost device for MS sample introduction in a GC-MS system. The open probe can be thermally connected to the available GC-MS transfer line heater 40 through thermal contact structure 41, and thus will not require any additional heater and its temperature controller. As a result, the MS transfer line temperature will also be the open probe temperature and it can be controlled through the standard GC-MS transfer line control software. The design shown in FIG. 5 differs from those shown in FIGS. 2, 3 and 4 in several respects: (a) the transfer line and open probe are properly thermally connected for good heat transfer at their interface 41; (b) the open probe is placed inside the GC oven 42 with its injector 43; (c) the injector gas transfer line column is interconnected with the open probe 44 (typically flexible fused silica capillary tube or 1/16" stainless steel tube); and (d) the injector gas supply system, which includes the inert gas (helium) cylinder 45, its pressure regular and valve 46 and injector electronic flow controller 47, is used as the source of inert gas. When the GC-MS is used in open probe mode, the GC injector 43 and its GC analytical column are not in use. Thus, the GC column can be removed and the injector can be connected to the open probe with a short capillary tube transfer line 44. As a result, the GC injector can provide the gas required by the open probe and control it through its electronic pressure or flow controller 47 as in the standard GC-MS application. In this case no special open probe pneumatic and gas supply system is needed since the GC injector and its software will be used for this purpose. The embodiment of the open probe illustrated in FIG. 5 represents an ideal design concept from the engineering simplicity point of view, which makes the open probe especially cost effective since it uniquely uses the already available GC-MS transfer line heating and GC injector gas supply system. Consequently, the open probe can be a very simple mechanical device without any dedicated electronics, pneumatics and/or software. In an additional embodiment of the device, when the open probe is combined with stand alone MS, the transfer line to the ion source can be designed as an integrated unit with the open probe (with one heater element) and an external gas supply is provided.

Figure 6:
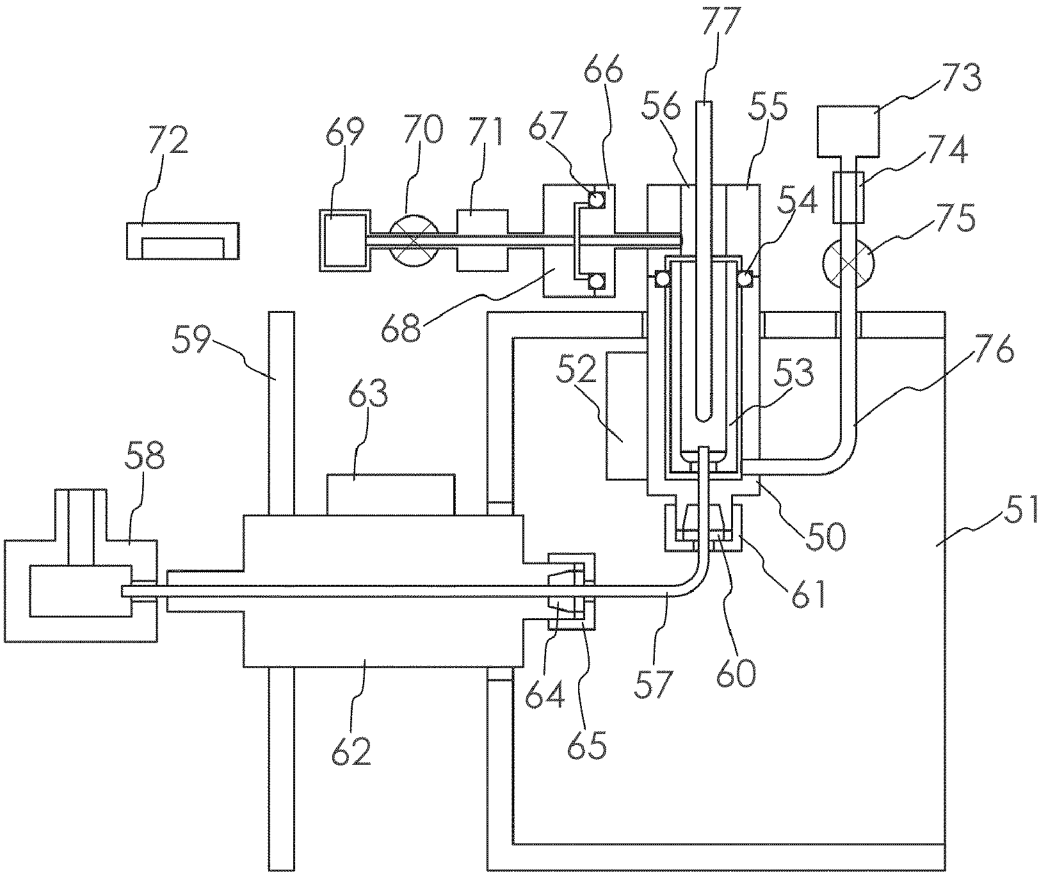
FIG. 6 is a schematic diagram illustrating an additional embodiment of the open probe device for its use in GC-MS systems while using the GC injector itself as the open probe oven with a modified injector upper opening for serving as a purge gas exit.

Reference is now made to FIG. 6, in which an additional embodiment of the present invention is illustrated schematically. In this embodiment, a standard GC injector is converted into an open probe source. In this embodiment, the open probe is based on a modified GC injector 50 mounted on a GC 51 of a GC-MS system. The injector has its standard heater 52 and internal liner 53 that is sealed by O-ring seal 54. Unique to the modified injector embodiment of the open probe is that the original injector septum and septum holder (seat) are removed and replaced with a gas purge protector element 55 that additionally comprises an opening to ambient room air and pressure 56. The GC analytical column is replaced by a capillary flow restrictor tube 57, e.g. a 50 cm long fused silica capillary tube with 0.15 mm ID that is adjusted by its length and internal diameter to deliver about 1 mL $min^{-1}$ to the MS ion source 58 and the transfer line is mounted onto the vacuum chamber with flange 59. The capillary flow restrictor tube is sealed to the injector with ferrule 60 which is clamped by clamp 61. The capillary flow restrictor is sealed to the MS transfer line 62 which is heated by heater 63 with ferrule 64 which is clamped by clamp 65 to the transfer line. The gas purge element 55 has its own gas introduction element 66 which is sealed by O-ring seal 67 into the original injector gas supply connection element 68. The gas supply of the open probe is provided from helium gas cylinder 69 and its pressure regulator and valve 70, and the gas flow rate is controlled by the original injector electronic flow controller element 71. When the open probe is not in use it can be closed and sealed by its clamp 72. In the embodiment illustrated in FIG. 6, the gas flow is split after the liner in order to reduce the open probe response time. The gas is pumped by vacuum pump 73 through its frit flow restrictor 74, valve 75, and split flow tubing 76, which can also serve as a flow restrictor element as described above. The inclusion of a flow splitter and a vacuum pump can provide an exceptionally fast (<1 s) response time. The sample can be conveniently introduced by glass tube 77 as described above.

Note that with certain gas chromatographs, the injector interlock that shuts off the injector gas supply in case of leaks (or when the injector is open to ambient pressure) must be deactivated. This embodiment of the open probe is uniquely characterized by the dual use of the injector, and its conversion into the open probe is very simple and with minimal added cost of goods since the injector has its own heated oven and flow control. Since according to this embodiment of the present invention, the transfer line is now longer, the GC oven must be heated during operation of the open probe in order to eliminate the possibility of cold points in the sample path. In addition, GC injectors are typically arranged with their liners perpendicular to the floor. This physical arrangement represents a disadvantage for operation as an open probe source, as it increases the chances of sample powder falling inside the injector and consequently contaminating the device for extended periods and thus impeding introduction of additional solid samples. The embodiment illustrated in FIG. 6 also requires the physical removal of the GC analytical column from the injector and GC oven. On the other hand, an additional major benefit of this approach is that in most GCs today the sample is automatically introduced with an autosampler that is adapted for syringe insertion into the GC injectors. Thus, through the replacement of the autosampler syringe with an open probe sample holder and added means for automated sample holder replacement, samples could be automatically introduced with minimal modifications of the autosampler. Suitable autosamplers are already available in the market for other applications such as liner exchange. This type of open probe automation is highly beneficial for high throughput applications.

Figure 7:
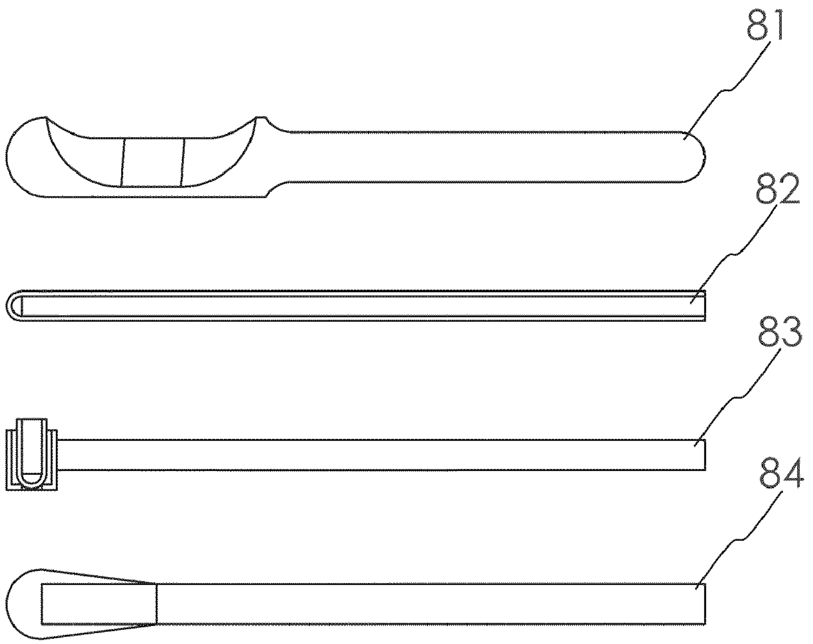
FIG. 7 is a schematic diagram illustrating four open probe sample introduction tools of sample spoon, thin glass tube, swab and sample vial holder.

Reference is now made to FIG. 7, in which four embodiments of the sample holder are illustrated schematically. The most universally applicable open probe sample holder is the sample spoon 81. Such a sample spoon can be prepared by standard techniques well-known to those skilled in the art from commercially available 8 mm OD glass tube. This embodiment of the sample holder is useful for introducing, e.g. such materials as tablets containing pharmaceutical substances, pieces of objects with samples on their surfaces, and other types of solids or liquids or sludge samples. Sample spoons of this type are also useful for the open probe sampling and analysis of samples that have been separated by thin layer chromatography plates. The powder from near the eluted sample area is removed and placed in the spoon. This spoon sample holder is also useful for providing constant sample flux for MS investigations. In this embodiment, however, a larger open probe oven with liner ID of about 9 mm is required, and consequently, high flow rates are necessary in order to have a reasonable self cleaning time.

A preferred embodiment of the sample holder 82 is a melting point tube such as with 1.6 mm OD and 1.1 mm ID. The sample is loaded on the external surface as described above. These glass tubes (vials) are characterized by low thermal mass and are thus quick to heat, self clean and cool for the next cycle. These melting point thin glass tubes/vials are widely available and are inexpensive hence can be provided as single-use sample holders. Additional embodiments of the sample holder include, e.g., solid phase micro extraction (SPME) devices that can be inserted directly into the open probe for their thermal extraction, wires coated with silicon tubing which may serve as SPME devices with extended sample capacity. An additional embodiment of the sample holder is a vial holder 83 with vials as used with standard MS probes to produce constant sample flux; the depth of insertion into the open probe oven determines the vaporization temperature. In contrast to standard MS probes, in the present invention, when a high open probe gas flow rate is used, the open probe can accept relatively large vials, e.g. with 2.5-3 mm diameter, which are much more convenient to use than the tiny standard MS probe vials. FIG. 7 illustrates a vial holder 83 that comprises a perpendicular vial position to reduce the chances of contamination of the open probe and enable the sampling of liquids. In an additional embodiment, the vial holder is designed to accept vials horizontally.

Another additional embodiment of the sample holder 84 is illustrated in FIG. 7. Swabs such as 84 are, in addition to being effective sample holders, are an effective means of sample collection from surfaces. Standard swabs are not appropriate for use with the present invention, however, as they emit phthalates and glue impurities above 120° C. Thus, for use with the present invention, sample holder 84 comprises a special swab constructed from high temperature Kevlar rope.

The combination of the open probe with supersonic GC-MS is especially effective for several reasons. First, with the supersonic GC-MS, very high open probe helium flow rates can be used, e.g. a total flow rate of 150 mL $min^{-1}$ partitioned into 90 mL $min^{-1}$ going to the transfer line and supersonic nozzle and 60 mL $min^{-1}$ serving for effective purge gas protection. This way, the open probe is evacuated very quickly (depending on the open probe liner volume, in as little as 0.2 s) and sample vaporization and removal are rapid, and hence the sample analysis is very fast. Furthermore, due to the short sample residence time in the open probe the amount of thermal degradation is minimized. In addition, the sample self cleaning time for subsequent analysis cycles is minimized. The use of high flow rate also enables the use of relatively large open probe liners, e.g. 9 mm I.D, enabling the use of large sample spoons with, e.g., an 8 mm sample holding compartment. Additional advantages of mass spectrometry with SMB include its ability to provide improved mass spectra with an enhanced molecular ion signal and the inherent inertness of the SMB fly-through ion source, which thus operates without any ion source degradation. The combination of supersonic GC-MS with the open probe is especially attractive when the open probe is thermally connected to the transfer line to the nozzle and the open probe gas is provided by the GC injector or when the GC injector itself is modified to serve as an open probe since in these cases the open probe is a surprisingly simple and low cost device.

Helium is by far the most preferred gas for use with the open probe since the ion sources for standard MS were developed specifically to work with a helium flow rate of about 1 mL $min^{-1}$, due to considerations of optimal space charge and reduced adverse effects of scattering at the mass analyzer. Although hydrogen (which is less expensive than helium) can also be used, it represents a hazard and may also activate the open probe liner and ion source metal walls, promoting catalytic sample degradation for certain classes of compounds. Nitrogen is a low cost inert gas, but its space charge at the ion source is about 8-10 times greater than of helium. In addition, the supersonic GC-MS preferably uses helium due to its aerodynamic acceleration and efficient jet separation. With supersonic GC-MS, the make up gas (to the nozzle) can be hydrogen (which as a result does not flow to the room) while the open probe gas could be nitrogen or argon. At a ratio of about 5-8% of open probe flow rate ratio to make up gas flow rate, the jet separation efficiency and SMB features are similar to those of helium.

In some cases it is still desirable to provide a constant sample flux for longer MS (and MS-MS) investigations. This can be achieved by proper temperature optimization of the open probe with the sample in a glass spoon holder. The sample is heated slowly until the desired temperature and its related sample flux is achieved (as in normal practice of standard MS probes). In this case the sample is inserted in the open probe oven without any necessity for the operator to hold the sample holder physically. As illustrated in FIG. 1 above, the open probe can be constructed with a longer heated zone and in a way that there will be a temperature gradient along its axis. In this way the optimal vaporization temperature for the sample is optimized through manipulation of the sample insertion depth. This embodiment provides faster sample flux optimization than can be obtained by open probe temperature programming/optimization since no oven temperature control is needed. On the other hand, this embodiment does increase the open probe oven length and hence the oven volume, consequently increasing the self cleaning time. The relatively low temperatures at the cool open probe entrance zone may also increase the self cleaning time as well.

In some cases spatial sample information is also needed or the sample is located on the surface of a body that is too large to be inserted into the open probe oven. In such a case, an alternative embodiment of the sample holder and sample evaporation components of the present invention is used. In this embodiment, desorption takes place outside of the oven. A tube of stainless steel, e.g. of 8 cm length, 0.75 mm OD, and 0.53 mm ID is used to deliver additional helium flow outside the open probe. A direct current of in the range of 2-3 A across the syringe-needle like stainless steel tube resistively heats it, and the heated helium jet that emerges from it is directed onto the sample surface. The heated helium thermally desorbs the sample, and the helium jet with its entrained vaporized sample is swept into the open probe. The purge flow rate is reduced sufficiently that the helium jet can penetrate into the open probe. An enclosure placed around the sample and helium jet prevents air from entering the open probe apparatus. In an additional embodiment, a sample transfer tube is placed near the heated jet desorption area up to the inside of the open probe to bypass the purge flow. In yet another additional embodiment, rather than introduce the jet directly into the open probe oven, the sample is desorbed in open air and the desorbed sample collected on a standard open probe sample holder as described above, which is then inserted in the normal way into the open probe, where secondary desorption from the standard sample holder takes place. According to this embodiment, laser desorption in the open air can also be used to provide one micron spatial resolution and open air sample size independent sampling. One major benefit of these indirect dual stage sample desorption methods is that no chemicals or solvents are used for sample preparation prior to sampling and that the sample can be collected far away from the mass spectrometer and laboratory.

The main limitation of MS probes, including the open probe, is that when the sample is found in mixtures or it is contaminated, library based or any other type of sample identification could fail. Thus, additional dimension of separation could be highly desirable. A very effective additional fast separation method is MS-MS using a triple quadrupole mass spectrometry system with collision activated dissociation. This way, as is well known, several target compounds can be screened in complex mixtures.

In an additional embodiment of the present invention, the transfer line is converted into a fast GC oven with limited GC separation power. The transfer line capillary column is placed inside a stainless steel tube which is resistively heated; due to its low thermal mass, the heating (temperature programming) and cooling rates are relatively rapid. The use of such fast GC is superior to MS-MS in its ability to use the library for sample identification but it may take longer time for the analysis.

The rapid self-cleaning and preservation of ion source cleanliness are additional important advantages of the open probe. Thus, the open probe can be disassembled and converted back to standard GC-MS in a few hours. In an additional embodiment of the present invention, the GC column is placed inside the open probe oven, and in this case the open probe acts as an open split interface where a portion of 1 mL $min^{-1}$ flows through the transfer line to the MS ion source as in standard GC-MS and the rest flows out of the open probe oven. In this way, conversion to GC-MS can be performed within about a few minutes and without any disassembly of the open probe. In this case the GC column is preferably fixed to the open probe by a special open probe clamp that does not seal it as in standard open split devices. In this embodiment, the GC oven temperature programming rate is limited due to the increased heat capacity of the open probe oven that may require slower programming rate to follow the GC oven temperature.

Example

Figure 8:
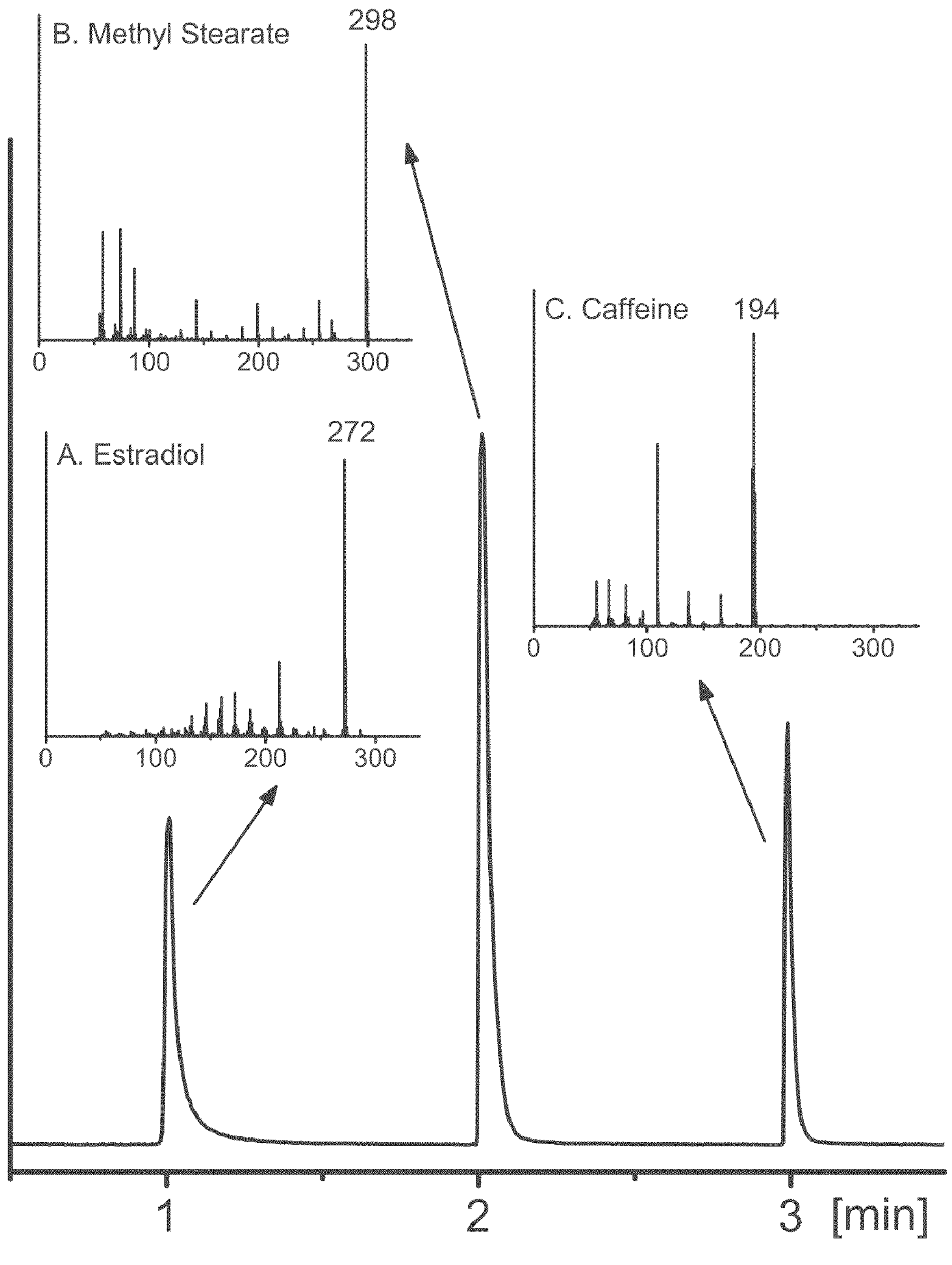
FIG. 8 illustrates typical experimental results obtained with the open probe.

Reference is now made to FIG. 8, in which typical results of an experiment using the present invention are presented. In contrast to standard MS probes that are operated with constant sample flux, the preferred mode of open probe operation is by generation of fast pulses of sample introduction that are characterized by fast sample flux rise and fall, as demonstrated in FIG. 8. This signal pulse is the result of isothermal open probe oven operation, the use of low thermal mass sample holders, sampling with limited sub microgram sample amounts, the use of high open probe helium flow rate relative to its volume and the open probe fast manual sample introduction (and removal) without sealing. In fact, the open probe is designed specifically to enable short analysis cycles and as a result it should preferably work with a hot isothermal oven without temperature programming. In this case, the sample is quickly introduced into the open probe oven since it is open and no seal must be released and later clamped. Sample vaporization is rapid due to the low thermal mass of the sample holder, and since only a small amount of sample is loaded, the sample is fully desorbed following quick sample removal and self cleaning by the inert gas flow. Note that the sample is desorbed into the liner only once its holder penetrates beyond the helium purging gas introduction area. As shown in FIG. 8, open probe analysis with full cycle time of less than 30 seconds is quite feasible. In fact, if the samples are preloaded onto their holders, analysis cycle times of less then 6 seconds can be readily achieved.

SUMMARY OF ADVANTAGES OF THE OPEN PROBE

The open probe is characterized by the following major features and advantages:

Fast: The full analysis cycle takes typically 30 seconds and rarely over a minute. If the sample on the glass tube holder is ready or prepared by a second person, the analysis itself by the open probe requires about 6 seconds for ready to the next sample and each sample produces a GC like peak as demonstrated in FIG. 8. This analysis time is much faster than with any other type of MS probe since no probe sealing is required, and the isothermal open probe oven is quickly cleaned by the high inert gas flow rate.

Safe: The open probe is inherently immune against leaks and thus can be used by untrained personnel, in contrast to standard MS probes. The reason for this feature is that it has a flow restriction capillary which adequately protects the MS ion source and vacuum system, and the helium purge out flow protects the MS ion source against air penetration with its potentially harmful effect of oxygen on its filament.

Easy sample introduction. The open probe is characterized by much bigger open probe oven hence sampling vial (or alternative sample holder) than the sample vial of any standard MS probe. Thus, it can accept a much broader range of samples and sample matrix shapes including liquids, sludge, powders and sample on or in solids or in swabbing clothes or swabs.

Flexible sampling. The open probe is exceptionally flexible in sample handing tools and methods and can accept samples in solution (unlike standard MS probe), in powders, on solid surfaces, in the form of tablets, as adsorbed airborne samples, on clean swabs and even gaseous samples can be leaked into the open probe oven.

Self cleaning: The open probe includes an inert glass or fused silica liner at its oven which (unlike metals) has a fast self cleaning. In addition, its high helium flow rate further helps to maintain fast self cleaning. However, the most important reason for the cleanliness of the open probe is the ability to restrict the sample amount to below a microgram.

Sensitive: The effective self cleaning and very fast response time of the open probe results in improved sensitivity. Sub one picogram limit of detection was demonstrated by us with the open probe for pyrene and the diazinon pesticide.

Easy and fast interchange with GC-MS: The open probe can be quickly removed and converted back into GC-MS. In some cases GC-MS operation can be achieved even without the disassembly of the open probe.

Simple and low cost: The open probe can be designed to be a very simple fully mechanical device. It can be thermally connected to the standard GC-MS transfer line and thus no additional heater and temperature controller is needed. An important reason for this is that it can uniquely work under isothermal conditions thus does not require temperature programmable heating. The gas can be provided by the GC injector in GC-MS systems since in any case the standard column must be disconnected from the MS transfer line when the open probe is operated. As a result, the GC injector could be available for its operation by the injector electronic flow control. Thus, the bottom line is that the open probe could be a fully mechanical device hence simple and low cost.

We feel that the combination of these eight advantageous features is surprising and the open probe according to the present application provides a powerful new method and low cost device for easy and fast sample introduction for its mass spectrometry analysis.

What is claimed is:

1. An open probe method for sample introduction into a mass spectrometer comprising the steps of:

a. loading a sample holder with sample compounds to be analyzed;
b. heating a probe oven;
c. introducing said sample compounds in said sample holder into said heated probe oven;
d. flowing inert gas into said heated probe oven;
e. vaporizing said sample in said heated probe oven by the combined effect of oven temperature and inert gas flow;
f. entraining said vaporized sample in said inert gas; and,
g. transferring said vaporized sample in inert gas into an ion source of a mass spectrometer;

wherein said heated probe oven remains open to the ambient atmosphere during sample introduction and analysis; and further wherein said inert gas flows in said heated probe oven in two directions of a transfer line to a mass spectrometer ion source and to the oven opening; and further wherein said vaporized sample in inert gas is transferred through a heated transfer line directly into the ionization chamber of an ion source of a mass spectrometer.

2. A method according to claim 1, wherein said inert gas is introduced at a flow rate greater than its flow rate through said transfer line and its excess flow rate purges and protects said open probe oven and mass spectrometer ion source from the penetration of air.

3. The method according to claim 1, wherein said heated transfer line includes a flow restrictor capillary tube that restricts and reduces the flow rate from said open probe oven to said ion source of a mass spectrometer and its vacuum chamber to a low flow rate level that can be accepted by said mass spectrometer and its ion source for their appropriate operation.

4. The method according to claim 1, wherein the step of flowing inert gas into said heated probe oven further comprises the steps of:

a. obtaining a vacuum pump;
b. interconnecting the inlet of said vacuum pump with said probe oven; and,
c. pumping said inert gas after passing said heated probe oven;

wherein pumping of said probe oven increases the flow rate of said inert gas through said heated probe oven, and further wherein said increase in flow rate increases the rate at which said sample is removed from said heated probe oven and hence decreases the overall analysis time.

5. The method according to claim 1, wherein the step of flowing inert gas into said heated probe oven further comprises the steps of:

a. obtaining a second gas source;
b. interconnecting the output of said second gas source via a regulated gas flow controller and gas valve into said probe oven from its outlet end;
c. producing a time programmed gas pulse according to a predetermined protocol; and
d. introducing said time programmed gas pulse into said heated probe oven from the outlet end of said heated probe oven;

wherein said gas pulse introduced into the probe oven from said outlet end expels said vaporized sample from said heated probe oven, whereby the rate at which said sample is removed from said heated probe oven is increased, and further whereby the overall analysis time is decreased.

6. The method according to claim 1, wherein the step of flowing inert gas into said heated probe oven further comprises the steps of:

a. obtaining a seal to said open probe oven opening;
b. interconnecting said heated probe oven from its outlet end with a gas tube to the ambient atmosphere; and,
c. sealing said open probe oven after sample introduction with said seal, whereby said flow of inert gas exits mostly from said gas tube;

wherein said probe oven sealing increases the flow rate of said inert gas through said heated probe oven, and further wherein said increase in flow rate increases the rate at which said sample is removed from said heated probe oven and hence decreases the overall analysis time.

7. The method according to claim 1, wherein the step of heating said probe oven is performed by means of thermal conduction from said transfer line alone.

8. The method according to claim 1, wherein said mass spectrometer is a part of a gas chromatograph mass spectrometer system.

9. The method according to claim 8, wherein said inert gas is provided from an injector of said gas chromatograph.

10. The method according to claim 8, further comprising the additional steps of:

a. obtaining an injector with its heater and flow controller for the GC portion of said GC-MS apparatus;
b. interconnecting with a capillary gas tube the outlet of said injector with said transfer line through said GC;
c. heating said converted injector with its heater;
d. heating said GC oven to enable the transfer of said sample compounds from said injector to said transfer line without their retention;
e. opening said injector to the ambient air by the removal of its septum and septum holder;
f. adding a purge flow protector to the upper portion of the open injector, whereby said flow protector enables unperturbed introduction of sample holders;
g. flowing inert gas at a predetermined rate from said flow controller of said injector into said heated injector in two directions of a transfer line and to said injector opening through the purge flow protector of said injector opening;
h. vaporizing said sample in said heated injector oven by the combined effect of injector temperature and inert gas flow;
i. entraining said vaporized sample in said inert gas; and,
j. transferring said vaporized sample in inert gas into an ion source of a mass spectrometer;

whereby a gas chromatograph injector is converted into an open probe.

11. The method according to any one of claims 7, 8, 9 or 10, wherein said vaporized sample is transferred in a heated transfer line into a supersonic nozzle, expanded from said supersonic nozzle into a vacuum system while forming a supersonic molecular beam with vibrationally cold sample molecules which are ionized with electrons while contained as vibrationally cold molecules in said supersonic molecular beam in a fly through electron ionization ion source.

12. The method according to claim 8, wherein the step of introducing said sample compounds into said heated probe oven further comprises the additional steps of:

a. obtaining a gas chromatography column comprising an input end and an output end;

b. interconnecting said input end of said gas chromatography column with said gas chromatograph injector; and c. interconnecting said output end of said gas chromatography column with the input end of said open probe.

13. The method according to claim 1, wherein the step of heating said probe oven comprises the additional step of providing a temperature gradient along the axis of said probe oven such that the side through which said sample enters is cooler than the side interconnected with said transfer line.

14. The method according to claim 1, wherein the step of loading said sample onto a sample holder comprises the step of placing said sample on the external surface of a sample holder chosen from the group consisting of (a) a glass tube of diameter below about 3 mm (b) a glass rod of diameter below about 3 mm.

15. The method according to claim 14, wherein the step of loading said sample onto a sample holder further comprises the step of loading a small quantity of sample such that evaporation of the sample is complete in less than about a few seconds, and further wherein the rapid evaporation of the sample provides a signal with rise and fall times of about a few seconds.

16. The method according to claim 15, wherein the sample analysis cycle time is less than about one minute.

17. The method according to claim 1, wherein the step of transferring said vaporized sample entrained in said inert gas via said transfer line into an ion source of said mass spectrometer further comprises the additional steps of a. obtaining a gas chromatography column comprising an input end and an output end;

b. interconnecting said input end of said gas chromatography column with said open probe oven;

c. interconnecting said output end of said gas chromatography column with said ion source;

d. programming the temperature of said gas chromatography column in said transfer line according to a predetermined protocol; and, e. separating in time said sample compounds before their mass analysis.

18. The method of either one of claims 1 or 10, wherein the steps of loading said sample compounds onto said sample holder and introducing said sample compounds in said sample holder into said heated probe oven further comprise the steps of:

a. obtaining a computer controlled autosampler;

b. obtaining at least one sample holder;

c. placing said at least one sample holder within said autosampler;

d. interconnecting said autosampler with said probe oven;

e. loading said sample onto said sample holder within said autosampler; and, f. transferring said loaded sample holder from said autosampler to said probe oven; and further wherein said step of transferring said loaded sample holder from said autosampler to said probe oven is performed automatically.

19. The method of claim 1, wherein the step of loading said sample onto said sample holder further comprises the steps of:

a. touching said sample with a sample holder chosen from the group consisting of (a) glass tube of diameter below about 3 mm and (b) glass rod of diameter below about 3 mm;

b. removing a portion of sample adhering to said sample holder, said step of removing a portion of sample adhering to said sample holder comprising the steps of;

c. placing at least one drop of solvent on the side of said sample holder to which said sample adheres;

d. dissolving a portion of said sample in said solvent;

e. allowing said solution to drip off of said sample holder; and, f. evaporating said solvent on said sample holder.

20. An open probe device for sample introduction into a mass spectrometer comprising:

a. a sample holder for holding sample compounds to be analyzed;

b. a probe oven;

c. a heater adapted for heating said probe oven;

d. a probe oven connection to an external source of gas;

e. a source of inert gas;

f. means for introducing said inert gas into said probe oven;

g. means for flowing said inert gas in said probe oven in two directions of a transfer line to said mass spectrometer and to the opening of said oven;

h. means for controlling the flow rate of said inert gas;

i. heated probe oven means for vaporizing said sample compounds by the combined effect of oven temperature and inert gas flow; and, j. heatable means for transferring said vaporized sample compounds into an ion source of a mass spectrometer interconnected at one end with said heated probe oven and at the other end with the ionization chamber of an ion source of a mass spectrometer;

wherein said heated probe oven remains open to the ambient atmosphere during sample introduction and analysis.

21. The device according to claim 20, further comprising means for purging said probe oven with a fraction of said inert gas to protect said open probe oven and mass spectrometer ion source from the penetration of air.

22. The device according to claim 20, wherein said heated transfer line further comprises a flow restrictor capillary tube adopted to reduce the flow rate of said inert gas from said open probe oven to said ion source of a mass spectrometer to a predetermined level which is appropriate for the operation of the mass spectrometer and its ion source.

23. The device according to claim 20, further comprising:

a. a vacuum pump;

b. means for interconnecting the flow path of said inert gas with the inlet of said vacuum pump; and, c. means for dividing said flow of inert gas subsequent to its exit from said probe oven such that a portion of said gas flows to said vacuum pump;

wherein said pumping of said gas flow increases the gas flow rate through said probe oven relative to the flow rate without said pumping.

24. The device according to claim 20, further comprising:

a. a second gas source with gas output;

b. means for interconnecting the output of said second gas source via a regulated gas flow controller and gas valve into said probe oven from its outlet end;

c. means for producing a time programmed gas pulse according to a predetermined protocol; and, d. means for introducing a time programmed gas pulse into said heated probe oven from its outlet end;

wherein said gas pulse introduced into the probe oven from its outlet end expels said vaporized sample from said heated probe oven, whereby increasing the rate at which said sample is removed from said heated probe oven and further whereby the overall analysis time is decreased.

25. The device according to claim 20, further comprising:

a. a seal for sealing said open probe oven opening; and, b. a gas tube for interconnecting said heated probe oven from its outlet end with the ambient atmosphere;

wherein said probe oven sealing after sample introduction forces said flow of inert gas to exit from said gas tube, thereby increasing the flow rate of said inert gas through said heated probe oven, and consequently increasing the rate at which said sample is removed from said heated probe oven, whereby the overall analysis time is decreased.

26. The device according to claim 20, wherein means for heating said open probe oven are provided by conduction of heat from said heated transfer line.

27. The device according to claim 20, wherein said mass spectrometer is a component of a gas chromatograph mass spectrometer system.

28. The device according to claim 27, wherein said inert gas is introduced into said probe oven by means of an injector of said gas chromatograph.

29. The device according to claim 27, wherein said heater for heating said probe oven is the GC injector heater, and further wherein said means for introducing said inert gas into said probe oven and controlling the flow rate of said inert gas is the GC injector flow controller, and further wherein said injector is open to the ambient atmosphere, and further comprising:

a. a capillary tube interconnected at one end with said gas chromatograph injector and at the other end with said transfer line; and b. means for purge flow protection at the upper portion of said injector which is converted into an open probe;

wherein a gas chromatograph injector is usable as an open probe.

30. The device according to any one of claims 26-29, further comprising:

a. means for transferring said vaporized sample from said open probe oven in a heated transfer line into a supersonic nozzle;

b. means for adding make up gas behind said supersonic nozzle;

c. supersonic nozzle and vacuum chamber means for forming a supersonic molecular beam comprising substantially vibrationally cold sample molecules;

d. a fly-through electron ionization ion source for the ionization of sample compounds in said supersonic molecular beam; and, e. means for collimating said supersonic molecular beam for its flight through said ion source.

31. The device according to claim 20, further comprising means for providing a temperature gradient along the axis of said probe oven such that the temperature is lower at the side from which said sample holder is introduced than at the side at which said transfer tube is interconnected with said probe oven.

32. The device according to claim 20, wherein said sample holder is chosen from the group consisting of (a) a glass tube of diameter less than about 3 mm and (b) a glass rod of diameter less than about 3 mm.

33. The device according to claim 20, adapted to provide evaporation of said sample within about a few seconds, said evaporation then providing a signal pulse with rise and fall times of about a few seconds.

34. The device according to claim 20, wherein the sample analysis cycle time is less than about one minute.

35. The device according to claim 20, wherein said means for transferring said vaporized sample compounds into an ion source of a mass spectrometer further comprises:

a. a gas chromatography column with an input end and an output end;

b. means for interconnecting said input end of said gas chromatography column with said open probe oven;

c. means for interconnecting said output end of said gas chromatography column with said ion source;

d. a heated transfer line; and, e. means for temperature programming of said gas chromatography column in said transfer line according to a predetermined protocol.

36. The device according to claim 20, further comprising:

a. a gas chromatography column with an input end and an output end;

b. means for interconnecting said input end of said gas chromatography column with said gas chromatograph injector; and, c. means for interconnecting said output end of said gas chromatography column with the input end of said open probe.

37. The device according to either one of claims 20 or 29, further comprising:

a. a computer controlled autosampler;

b. means for placing said sample holder within said autosampler;

c. means for interconnecting said autosampler with said probe oven;

d. means for loading said sample onto said sample holder within said autosampler; and, e. means for transferring said loaded sample holder from said autosampler to said probe oven;

wherein sample transfer is performed substantially automatically.

38. The device according to claim 20, further comprising a narrow neck for said probe oven wherein said narrow neck prevents the user of said device from touching a hot surface.

39. The device according to claim 20, especially adapted for introducing a sample into a tandem MS-MS.

40. A method for converting a standard GC injector to an open probe source for introduction of a sample into a mass spectrometer, comprising the steps of:

a. opening said injector to the ambient air by the removal of its septum and septum holder;

b. adding a purge flow protector to the upper portion of said injector to replace the septum and septum holder, whereby said flow protector enables unperturbed introduction of sample holders into said open probe source;

c. replacing the GC column with a capillary flow restrictor tube;

d. flowing inert gas from the flow controller of said injector through the injector into said purge flow protector and capillary flow restrictor tube according to a predetermined protocol;

e. interconnecting said capillary flow restrictor tube with a transfer line to a mass spectrometer through said GC oven; and, f. heating said GC oven to enable the transfer of said sample compounds from said injector to said transfer line without their retention.

* * * * *